US012603392B2

(12) United States Patent
Tanaka

(10) Patent No.: US 12,603,392 B2
(45) Date of Patent: Apr. 14, 2026

(54) SQUARE SECONDARY BATTERY AND MANUFACTURING METHOD THEREOF

(71) Applicant: VEHICLE ENERGY JAPAN INC., Ibaraki (JP)

(72) Inventor: Nobuyoshi Tanaka, Ibaraki (JP)

(73) Assignee: VEHICLE ENERGY JAPAN INC., Ibaraki (JP)

( * ) Notice: Subject to any disclaimer, the term of this patent is extended or adjusted under 35 U.S.C. 154(b) by 276 days.

(21) Appl. No.: 18/002,365

(22) PCT Filed: Sep. 28, 2021

(86) PCT No.: PCT/JP2021/035487
§ 371 (c)(1),
(2) Date: Dec. 19, 2022

(87) PCT Pub. No.: WO2022/190439
PCT Pub. Date: Sep. 15, 2022

(65) Prior Publication Data
US 2023/0411793 A1     Dec. 21, 2023

(30) Foreign Application Priority Data
Mar. 8, 2021     (JP) ................................. 2021-036042

(51) Int. Cl.
*H01M 50/477*      (2021.01)
*H01M 50/103*      (2021.01)
*H01M 50/15*        (2021.01)
(52) U.S. Cl.
CPC ....... *H01M 50/477* (2021.01); *H01M 50/103* (2021.01); *H01M 50/15* (2021.01)

(58) Field of Classification Search
CPC ... H01M 50/477; H01M 50/103; H01M 50/15
See application file for complete search history.

(56) References Cited

U.S. PATENT DOCUMENTS

| | | | |
|---|---|---|---|
| 10,128,469 B2 | 11/2018 | Hattori et al. | |
| 2014/0308555 A1* | 10/2014 | Hattori | H01M 50/103 29/623.2 |
| 2017/0047571 A1 | 2/2017 | Iwasaki et al. | |

FOREIGN PATENT DOCUMENTS

JP        6092108 B2      3/2017

OTHER PUBLICATIONS

International Search Report, mailed Nov. 30, 2021, for International Application No. PCT/JP2021/035487.
(Continued)

*Primary Examiner* — Jane J Rhee
(74) *Attorney, Agent, or Firm* — Baker Botts L.L.P.

(57) ABSTRACT

A square secondary battery, including: a conductive container which is formed in a rectangular parallelepiped shape opened on one surface side; a lid which seals the one surface side of the container; a charge/discharge body which is housed in the container and which has electrodes respectively formed on both sides in a width direction; and an insulating member which coats the charge/discharge body and which insulates the charge/discharge body and the container from each other, wherein the insulating member is formed in a rectangular parallelepiped shape opened on one surface side and at least one side surface among a pair of side surfaces respectively opposing the electrodes of the charge/discharge body is folded in a direction of separation from the charge/discharge body along a height direction.

11 Claims, 7 Drawing Sheets

(56)            References Cited

OTHER PUBLICATIONS

Extended European Search Report, mailed Jun. 20, 2025, for
European Application No. 21930286.6.

* cited by examiner (A)

(B)

SQUARE SECONDARY BATTERY AND MANUFACTURING METHOD THEREOF

TECHNICAL FIELD

The present invention relates to a square secondary battery and a manufacturing method thereof which are suitably applicable to, for example, a square secondary battery in which a battery container and a wound electrode group are insulated from each other by an insulating member.

BACKGROUND ART

In recent years, an increase in popularity of mobile electronic equipment such as smartphones and notebook personal computers, combined with advances in development and practical applications of hybrid cars and electric vehicles, have contributed to a growing demand for secondary batteries. Accordingly, research and development of techniques related to secondary batteries are being promoted.

For example, PLT 1 discloses, for the purpose of reducing interference between an insulating member and an outer can when inserting an electrode body coated by the insulating member into the outer can, making a width of at least a pair of opposing side surfaces in the insulating member smaller than a width of the electrode body opposed by the pair of side surfaces.

CITATION LIST

Patent Literature

[PLT 1] Japanese Patent No. 6092108

SUMMARY OF INVENTION

Technical Problem

With the square sealed secondary battery disclosed in PLT 1, since a dimension of the insulating member is formed smaller than the electrode body as described above, there is a manufacturing problem in that an insertion failure readily occurs when inserting the electrode body into the insulating member, resulting in a low yield.

In addition, in terms of reliability in a product state of the square sealed secondary battery described above, since a pressing force attributable to being pressed by a current collector of the electrode body is constantly generated on a small area-side of the insulating member, there is a problem in that a tensile stress to the side surface is generated when the electrode body swells during charge/discharge, resulting in reduced long-term reliability of the insulating member.

The present invention has been made in consideration of the points described above and proposes a square secondary battery and a manufacturing method thereof capable of suppressing a decline in yield while also improving long-term reliability of an insulating member.

Solution to Problem

In order to solve the problem described above, the present invention proposes a square secondary battery including: a conductive container which is formed in a rectangular parallelepiped shape opened on one surface side; a lid which seals the one surface side of the container; a charge/discharge body which is housed in the container and which has electrodes respectively formed on both sides in a width direction; and an insulating member which coats the charge/discharge body and which insulates the charge/discharge body and the container from each other, wherein the insulating member is formed in a rectangular parallelepiped shape opened on one surface side and at least one side surface among a pair of side surfaces respectively opposing the electrodes of the charge/discharge body is folded in a direction of separation from the charge/discharge body along a height direction.

In addition, the present invention proposes a manufacturing method of a square secondary battery, the square secondary battery including: a conductive container which is formed in a rectangular parallelepiped shape opened on one surface side; a lid which seals the one surface side of the container; a charge/discharge body which is housed in the container and which has electrodes respectively formed on both sides in a width direction; and an insulating member which coats the charge/discharge body and which insulates the charge/discharge body and the container from each other, the insulating member being formed in a rectangular parallelepiped shape opened on one surface side by folding an insulation sheet formed of an insulation material, and at least one side surface among a pair of side surfaces respectively opposing the electrodes of the charge/discharge body being folded in a direction of separation from the charge/discharge body along a height direction, the manufacturing method including: a first step of creating the insulation sheet; a second step of forming the insulating member by folding the insulation sheet; and a third step of housing the charge/discharge body so as to insert the charge/discharge body into the insulating member from the open one surface side of the insulating member.

Furthermore, the present invention proposes a manufacturing method of a square secondary battery, the square secondary battery including: a conductive container which is formed in a rectangular parallelepiped shape opened on one surface side; a lid which seals the one surface side of the container; a charge/discharge body which is housed in the container and which has electrodes respectively formed on both sides in a width direction; and an insulating member which coats the charge/discharge body and which insulates the charge/discharge body and the container from each other, the insulating member being formed in a rectangular parallelepiped shape opened on one surface side by folding an insulation sheet formed of an insulation material, and at least one side surface among a pair of side surfaces respectively opposing the electrodes of the charge/discharge body being folded in a direction of separation from the charge/discharge body along a height direction, the manufacturing method including: a first step of creating the insulation sheet; and a second step of forming the insulating member by folding the insulation sheet so as to coat the charge/discharge body.

In the present invention, the charge/discharge body is a storage capacitor which is electrically coupled to an external electrode of a square secondary battery and which charges and discharges electricity via the external electrode. As one embodiment, the charge/discharge body is constituted of: a wound electrode group which charges and discharges electricity; a positive electrode collector plate which couples the wound electrode group and a positive electrode-side external electrode to each other; and a negative electrode collector plate which couples the wound electrode group and a negative electrode-side external electrode to each other.

With the square secondary battery and the manufacturing method thereof according to the present invention, a clearance between the charge/discharge body and the insulating member when coating or after coating the charge/discharge body with the insulating member can be secured. Therefore, according to the present invention, for example, even in a case where the charge/discharge body is inserted into the insulating member when coating the charge/discharge body with the insulating member, an occurrence of an insertion failure attributable to the charge/discharge body interfering with an edge section of an opening section of the insulating member can be suppressed and, furthermore, a tensile stress generated in the insulating member in association with swelling of the charge/discharge body during charge and discharge can be alleviated.

Advantageous Effect of Invention

According to the present invention, a square secondary battery and a manufacturing method thereof capable of suppressing a decline in yield while also improving long-term reliability of an insulating member can be realized.

DESCRIPTION OF EMBODIMENTS

Hereinafter, embodiments of the present invention will be described in detail with reference to the drawings.

Figure 1:
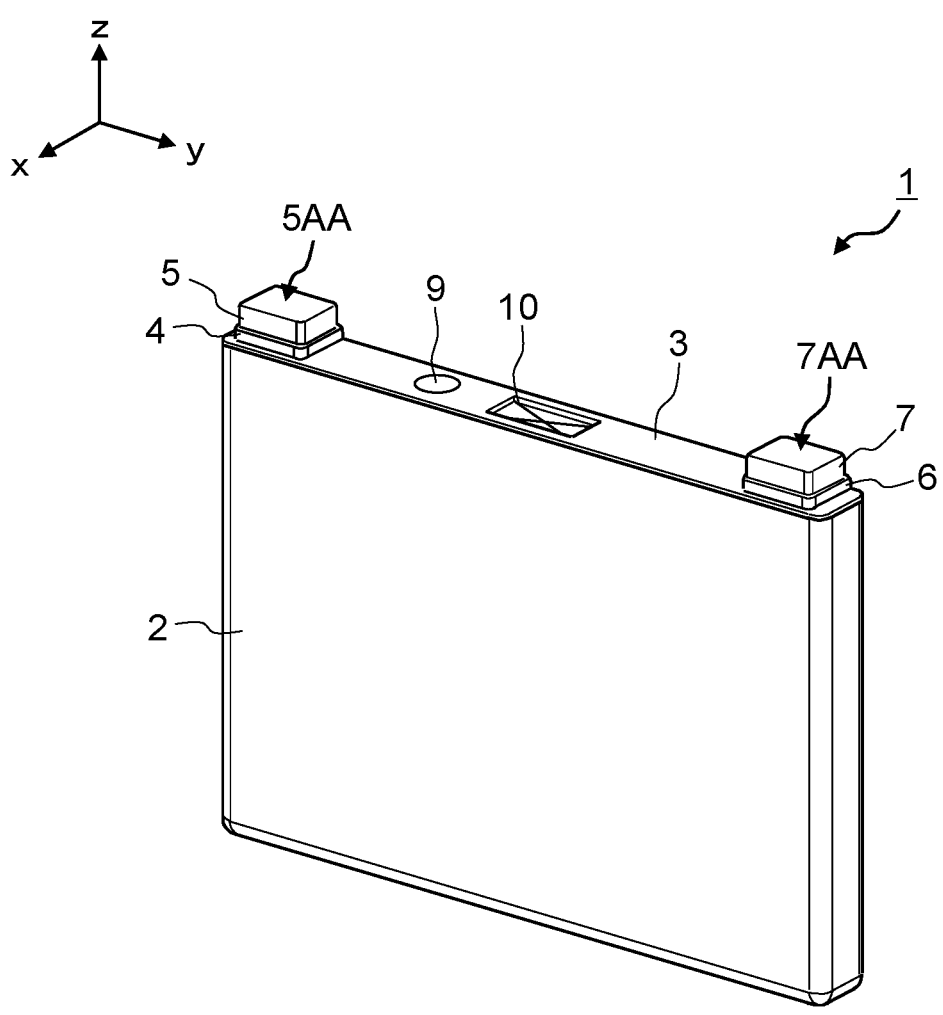
FIG. 1 is a perspective view showing an outer appearance configuration of a square secondary battery according to first to third embodiments.

(1) First Embodiment (1-1) Configuration of Square Secondary Battery According to Present Embodiment In FIG. 1, reference numeral 1 denotes a square secondary battery according to the present embodiment as a whole. The square secondary battery 1 is configured to include a battery can 2 and a battery lid 3 which form a hermetic container. The battery can 2 and the battery lid 3 are constituted of, for example, a metal material such as an aluminum alloy and are formed by deep drawing or press working.

The battery lid 3 is formed in an approximately rectangular flat-plate shape and is welded to the battery can 2 so as to seal the battery can 2. A positive electrode external terminal 5 is fixed to the battery lid 3 via a gasket 4 made of an insulation member molded by insert molding or press molding, and a negative electrode external terminal 7 is fixed to the battery lid 3 via a similar gasket 6.

Figure 2:
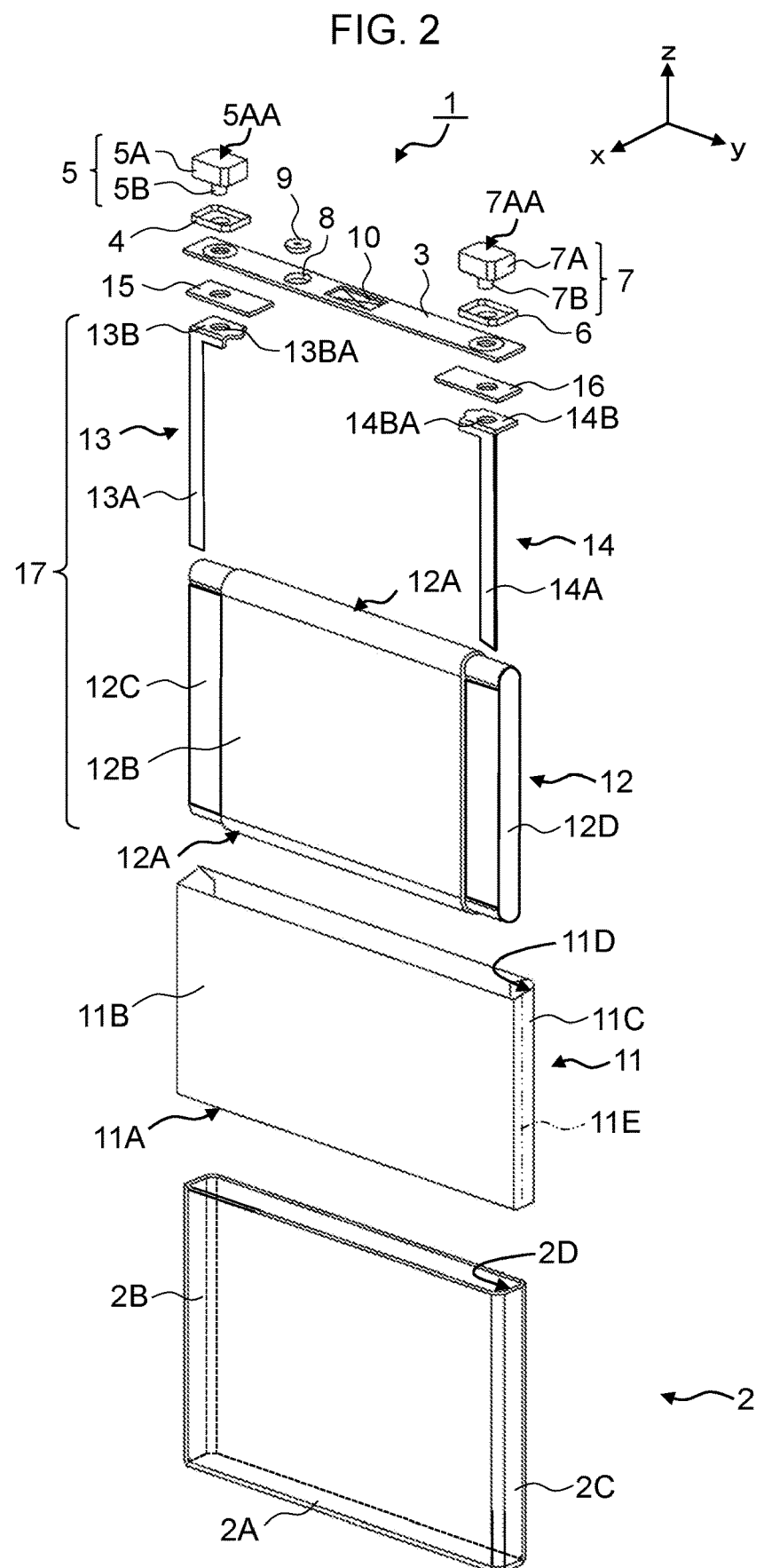
FIG. 2 is an exploded perspective view showing an internal configuration of the square secondary battery shown in FIG. 1.

As shown in FIG. 2, the positive electrode external terminal 5 and the negative electrode external terminal 7 are configured to include external terminal base sections 5A and 7A respectively exposed above the gaskets 4 and 6 and pin sections 5B and 7B formed on lower sides of the external terminal base sections 5A and 7A. In addition, the external terminal base sections 5A and 7A of the positive electrode external terminal 5 and the negative electrode external terminal 7 are provided with flat surfaces 5AA and 7AA parallel to the battery lid 3, and a busbar or the like is brought into contact with the flat surfaces 5AA and 7AA and joined by welding thereto.

Furthermore, an electrolyte injection hole 8 (FIG. 2) for injecting an electrolyte into the battery can 2 is drilled in the battery lid 3. An electrolyte injection plug 9 is joined to the electrolyte injection hole 8 by laser welding to seal the electrolyte injection hole 8 after welding the battery lid 3 to the battery can 2 to form a battery container and injecting the electrolyte into the battery container. As the electrolyte to be injected into the battery can 2, for example, a nonaqueous electrolyte prepared by dissolving a lithium salt such as lithium hexafluorophosphate (LiPF$_6$) in a carbonate ester-based organic solvent such as ethylene carbonate is used.

Furthermore, the battery lid 3 is provided with a gas exhaust valve 10. The gas exhaust valve 10 is a valve which opens when internal pressure of the battery container rises in order to release gas inside the battery container and reduce the internal pressure of the battery container, and safety of the square secondary battery 1 is secured by the gas exhaust valve 10.

FIG. 2 shows an exploded perspective view of the present square secondary battery 1. As is apparent from FIGS. 1 and 2, the battery can 2 has a rectangular bottom surface 2A, a pair of wide-width side surfaces 2B which rise from respective long sides of the bottom surface 2A, a pair of narrow-width side surfaces 2C which rise from respective short sides of the bottom surface 2A, and an opening section 2D which is opened upward at upper ends of the wide-width side surfaces 2B and the narrow-width side surfaces 2C. The opening section 2D is sealed by the battery lid 3 as described above.

The battery can 2 houses a wound electrode group 12 coated by an insulating member 11 made of a resin. The wound electrode group 12 is a storage capacitor for charging and discharging electricity which is formed in a flat shape and which has a pair of mutually-opposing curved sections 12A with semicircular cross sections and a pair of planer sections 12B for connecting between the pair of curved sections 12A. The wound electrode group 12 is arranged in the battery can 2 so that a winding axis direction is parallel to a lateral direction (y axis) of the battery can 2. In other words, the wound electrode group 12 is inserted into the battery can 2 so that one of the curved sections 12A is positioned on a side of the bottom surface 2A of the battery can 2 and a side of the other curved section 12A is positioned on a side of the opening section 2D of the battery can 2.

A positive electrode foil-exposed section 12C (to be described later) which constitutes a positive electrode of the wound electrode group 12 is formed on one end side in a width direction (y axis) of the wound electrode group 12 and the positive electrode foil-exposed section 12C is electrically coupled to a positive electrode collector plate 13. In addition, a negative electrode foil-exposed section 12D (to be described later) which constitutes a negative electrode of the wound electrode group 12 is formed on another end side in the width direction of the wound electrode group 12 and the negative electrode foil-exposed section 12D is electrically coupled to a negative electrode collector plate 14.

For all practical purposes, the positive electrode collector plate 13 includes a positive electrode-side coupling end section 13A which extends toward the side of the bottom surface 2A along the wide-width side surface 2B of the battery can 2 and the positive electrode-side coupling end section 13A is coupled in a state of opposing and overlapping with the positive electrode foil-exposed section 12C of the wound electrode group 12. In addition, a positive electrode external terminal coupling section 13B which is bent and formed so as to be parallel to the battery lid 3 is provided on an opposite side to the positive electrode-side coupling end section 13A in a longitudinal direction in the positive electrode collector plate 13, the pin section 5B of the positive electrode external terminal 5 is fitted into a hole 13BA drilled in the positive electrode external terminal coupling section 13B, and the positive electrode external terminal coupling section 13B and the pin section 5B are joined to each other by welding to electrically and physically couple the positive electrode external terminal 5 and the positive electrode collector plate 13.

In a similar manner, the negative electrode collector plate 14 includes a negative electrode-side coupling end section 14A which extends toward the side of the bottom surface 2A along the wide-width side surface 2B of the battery can 2 and the negative electrode-side coupling end section 14A is coupled in a state of opposing and overlapping with the negative electrode foil-exposed section 12D of the wound electrode group 12. In addition, a negative electrode external terminal coupling section 14B which is bent and formed so as to be parallel to the battery lid 3 is provided on an opposite side to the negative electrode-side coupling end section 14A in a longitudinal direction in the negative electrode collector plate 14, the pin section 7B of the negative electrode external terminal 7 is fitted into a hole 14BA drilled in the negative electrode external terminal coupling section 14B, and the negative electrode external terminal coupling section 14B and the pin section 7B are coupled to each other by welding to electrically and physically couple the negative electrode external terminal 7 and the negative electrode collector plate 14.

As described above, in the wound electrode group 12, due to the positive electrode foil-exposed section 12C being electrically coupled to the positive electrode external terminal 5 via the positive electrode collector plate 13 and the negative electrode foil-exposed section 12D being electrically coupled to the negative electrode external terminal 7 via the negative electrode collector plate 14, charge and discharge with respect to the wound electrode group 12 can be performed from outside via the positive electrode external terminal 5 and the negative electrode external terminal 7.

Therefore, an insulating plate 15 for electrically insulating the positive electrode collector plate 13 and the battery lid 3 from each other is provided therebetween, and an insulating plate 16 for electrically insulating the negative electrode collector plate 14 and the battery lid 3 from each other is also provided therebetween. In addition, the gasket 4 described earlier for electrically insulating the battery lid 3 and the positive electrode external terminal 5 from each other is provided therebetween, and the gasket 6 described earlier for electrically insulating the battery lid 3 and the negative electrode external terminal 7 from each other is also provided therebetween.

As a material for forming the positive electrode collector plate 13, for example, an aluminum alloy can be applied, and as a material for forming the negative electrode collector plate 14, for example, a copper alloy can be applied. In addition, as a material for forming the gaskets 4 and 6, for example, an insulating resin material such as polybutylene terephthalate, polyphenylene sulfide, or perfluoroalkoxy fluororesin can be applied.

The insulating member 11 is a member for insulating the battery can 2 and a charge/discharge body 17 which is housed in the battery can 2 and which is constituted of the wound electrode group 12, the positive electrode collector plate 13, and the negative electrode collector plate 14 from each other and the insulating member 11 is formed by folding and assembling a single insulation sheet. The insulating member 11 is formed in a rectangular parallelepiped shape having a rectangular bottom surface 11A to oppose an inside surface of the rectangular bottom surface 2A of the battery can 2 when housed in the battery can 2, a pair of wide-width side surfaces 11B which rise from respective long sides of the bottom surface 11A, a pair of narrow-width side surfaces 11C which rise from respective short sides of the bottom surface 11A, and an opening section 11D which is opened upward at upper ends of the wide-width side surfaces 11B and the narrow-width side surfaces 11C. The wound electrode group 12 is inserted into the insulating member 11 from the opening section 11D so that a winding axis direction coincides with a lateral direction of the insulating member 11 and the battery can 2 and is housed in the battery can 2 in a state of being coated by the insulating member 11.

In the insulating member 11, a crease 11E is provided in a height direction (z axis) from the opening section 11D so as to reach the bottom surface 11A at a center position in a width direction (x axis) of each narrow-width side surface 11C. With respect to the narrow-width side surface 11C of the insulating member 11 opposing the positive electrode-side coupling end section 13A of the positive electrode collector plate 13 constituting the charge/discharge body 17, the crease 11E is folded in a direction in which the narrow-width side surface 11C separates from the wound electrode group 12 (more accurately, a direction in which the wound electrode group 12 separates from the positive electrode-side coupling end section 13A), and with respect to the narrow-width side surface 11C of the insulating member 11 opposing the negative electrode-side coupling end section 14A of the negative electrode collector plate 14, the crease 11E is folded in a direction in which the narrow-width side surface 11C separates from the wound electrode group 12 (more accurately, a direction in which the wound electrode group 12 separates from the negative electrode-side coupling end section 14A).

Figure 3:
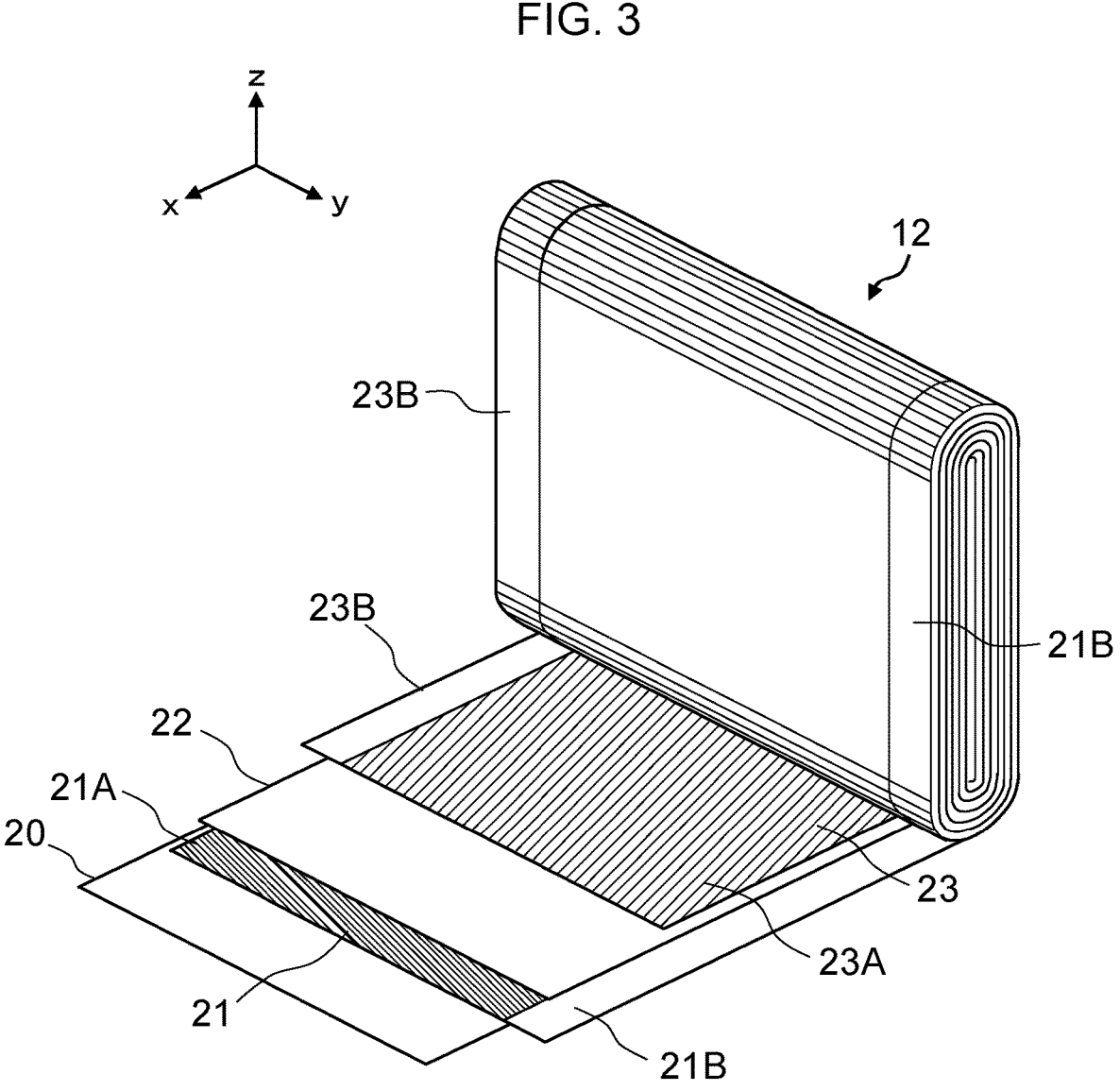
FIG. 3 is an exploded perspective view showing a configuration of a wound electrode group.

FIG. 3 shows a situation where a part of the wound electrode group 12 has been expanded. The wound electrode group 12 is formed in a flat shape by stacking a first separator 20, a negative electrode 23, a second separator 22, and a positive electrode 21 respectively formed in a band shape on top of each other in this order and winding the stack around a flat plate-like axial core (not illustrated) with the positive electrode 21 on the inside. In this case, the first and second separators 20 and 22 are formed of an insulation material and, accordingly, the positive electrode 21 and the negative electrode 23 are wound in an insulated state.

The positive electrode 21 is configured to include a positive electrode mixture layer 21A formed by applying a positive electrode active material (a positive electrode mixture) on both surfaces of an electrode foil (hereinafter, also referred to as a positive electrode foil) being a positive electrode current collector and a positive electrode foil-exposed section 21B which is provided on a side of one end in a width direction (y axis) of the positive electrode foil and on which the positive electrode mixture is not applied.

In a similar manner, the negative electrode 23 is configured to include a negative electrode mixture layer 23A formed by applying a negative electrode active material (a negative electrode mixture) on both surfaces of an electrode foil (hereinafter, also referred to as a negative electrode foil) being a negative electrode current collector and a negative electrode foil-exposed section 23B which is provided on a side of another end in a width direction (y axis) of the negative electrode foil and on which the negative electrode mixture is not applied.

The positive electrode foil-exposed section 21B and the negative electrode foil-exposed section 23B are respectively regions where a metal surface of the negative electrode foil or the positive electrode foil is exposed, and the positive electrode 21 and the negative electrode 23 are wound so that the positive electrode foil-exposed section 21B and the negative electrode foil-exposed section 23B are respectively positioned on one side and another side in the winding axis direction.

The negative electrode mixture layer 23A of the negative electrode 23 is formed with a width causing both sides in the width direction (y axis) slightly protrude from the positive electrode mixture layer 21A of the positive electrode 21 and, accordingly, in a state where the positive electrode 21 and the negative electrode 23 are wound, the positive electrode mixture layer 21A of the positive electrode 21 is always positioned so as to be sandwiched by the negative electrode mixture layer 23A of the negative electrode 23. In addition, the positive electrode foil-exposed section 21B and the negative electrode foil-exposed section 23B are respectively bundled together and coupled by welding or the like. In this case, while the first and second separators 20 and 22 are wider than the negative electrode mixture layer 23A in the width direction, since the first and second separators 20 and 22 are wound in the positive electrode foil-exposed section 21B and the negative electrode foil-exposed section 23B at positions of the end sections where the metal surface of the negative electrode foil or the positive electrode foil is exposed, the first and second separators 20 and 22 do not interfere with the bundling and welding of the positive electrode foil-exposed section 21B and the negative electrode foil-exposed section 23B.

The positive electrode mixture of the positive electrode 21 can be fabricated by respectively adding, to 100 wt % of lithium manganate ($LiMn_2O_4$) as a positive electrode active material, 10 wt % of scale-like graphite as a conductive material and 10 wt % of polyvinylidene fluoride as a binder, and further adding N-methylpyrrolidone as a dispersion solvent and mixing the mixture. By applying the positive electrode mixture to both surfaces of a 20 μm-thick band-like aluminum foil (positive electrode foil) with the exception of a portion to become the positive electrode foil-exposed section 21B and subsequently drying, pressing, and cutting the aluminum foil, the positive electrode 21 in which a thickness of only the positive electrode mixture layer 21A excluding the aluminum foil is 90 μm can be fabricated.

However, as the positive electrode active material, other lithium manganates having a spinel crystal structure or a lithium manganese composite oxide having been partially replaced or doped with metal elements, lithium cobaltate or lithium titanate having a lamellar crystal structure, or a lithium-metal composite oxide in which a part of lithium cobaltate or lithium titanate is replaced or doped with metal elements may be applied instead of lithium manganate.

In addition, the negative electrode mixture of the negative electrode 23 can be fabricated by adding, to 100 wt % of amorphous carbon powder as a negative electrode active material, 10 wt % of polyvinylidene fluoride (PVDF) as a binder and further adding N-methylpyrrolidone (NMP) as a dispersion solvent and mixing the mixture. By applying the negative electrode mixture to both surfaces of a 10 μm-thick band-like copper foil (negative electrode foil) with the exception of a portion to become the negative electrode foil-exposed section 23B and subsequently drying, pressing, and cutting the copper foil, the negative electrode 23 in which a thickness of only the negative electrode mixture layer 23A excluding the copper foil is 70 μm can be fabricated.

However, the negative electrode active material is not limited to amorphous carbon and carbonaceous material such as natural graphite which enables lithium ions to be inserted and removed, various artificial graphite material, and coke, compounds of Si or Sn such as SiO or TiS, or a composite material thereof may be used, and a particle shape of the negative electrode active material is not particularly limited and may be a scale-like shape, a spherical shape, a fibrous shape, or a clumped shape.

In addition, as the binder for the coated sections in the positive electrode 21 and the negative electrode 23, polymers such as polytetrafluoro-thylene, polyethylene, polystyrene, polybutadiene, butyl rubber, nitrile rubber, styrene-butadiene rubber, polysulfide rubber, cellulose nitrate, cyanoethyl cellulose, various latexes, acrylonitrile, vinyl fluoride, vinylidene fluoride, propylene fluoride, chloroprene fluoride, and acrylic resins, and mixtures thereof can be used instead of polyvinylidene fluoride.

Furthermore, as the axial core of the wound electrode group 12, for example, an axial core constructed by winding a resin sheet with higher bending rigidity than any of the positive electrode foil, the negative electrode foil, and the first and second separators 20 and 22 can be used.

Figure 4:
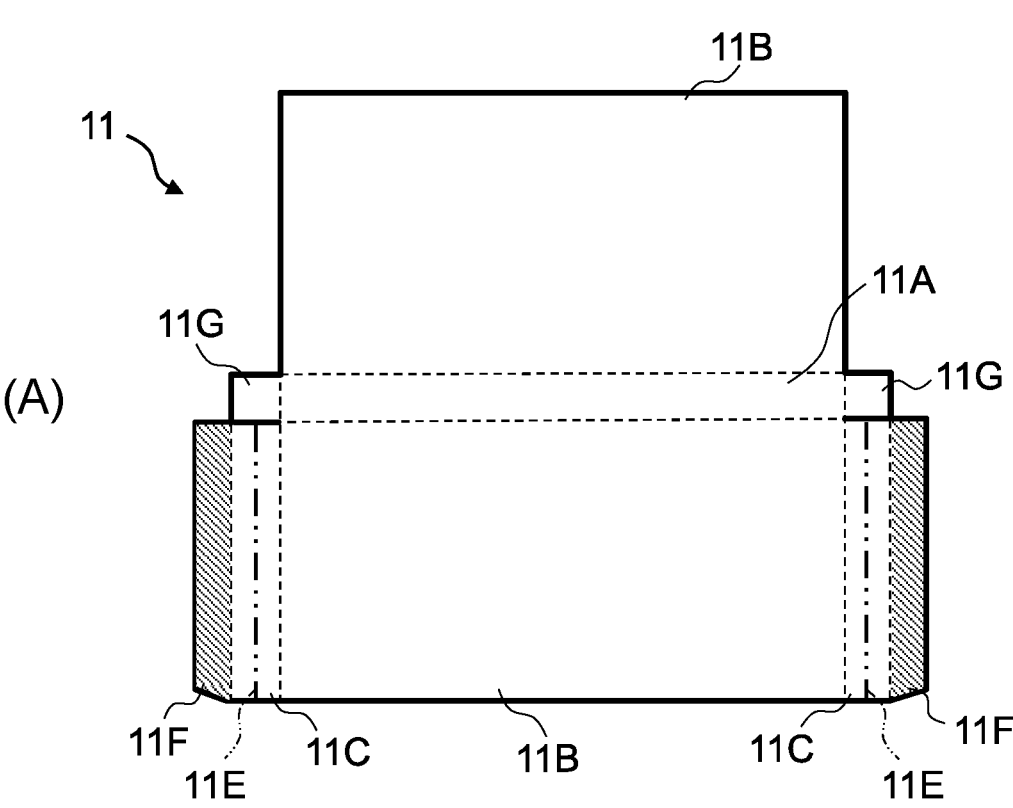
FIG. 4(A) is a development view of an insulating member according to the first embodiment and FIG. 4(B) is an assembly diagram thereof.
Figure 4:
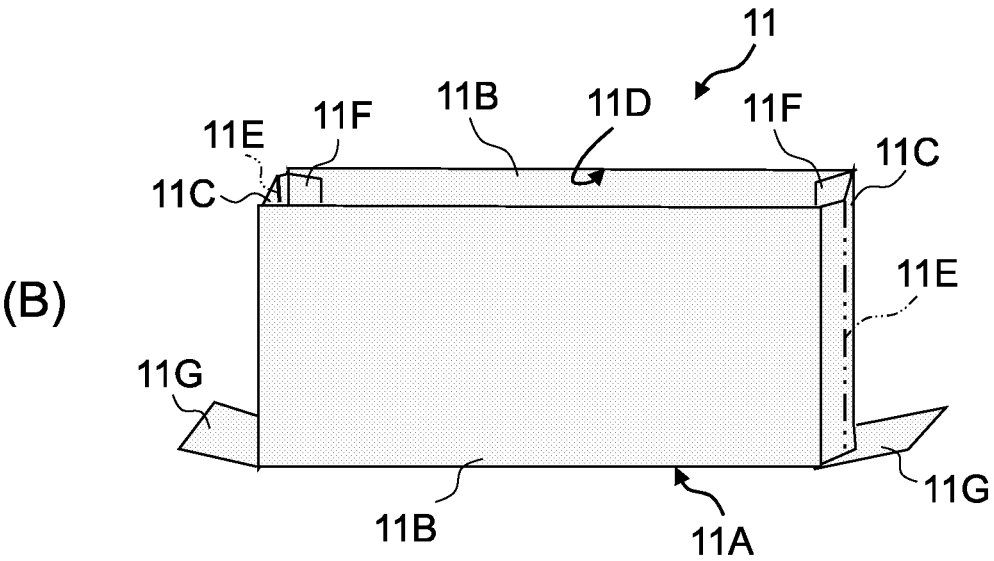

On the other hand, FIG. 4 shows a configuration of the insulating member 11. As described above, the insulating member 11 is formed by folding a single insulation sheet and FIG. 4(A) shows a development view thereof while FIG. 4(B) shows an assembly diagram thereof.

As shown in FIG. 4(A), in addition to the bottom surface 11A, the pair of wide-width side surfaces 11B, and the pair of narrow-width side surfaces 11C, the insulating member 11 includes heat welding object sections 11F (hatched portions in FIG. 4) which are respectively provided on an outer side of each narrow-width side surface 11C and which are heat-welded to the wide-width side surfaces 11B during assembly and wing sections 11G respectively provided on both sides in a longitudinal direction of the bottom surface 11A.

The wing sections 11G are portions which prevent insertability of the insulating member 11 into the battery can 2 from declining due to the side of the bottom surface 11A of the mountain-folded narrow-width side surface 11C of the insulating member 11 being caught by the opening section 2D (FIG. 2) of the battery can 2 when inserting the insulating member 11 into the battery can 2.

For all practical purposes, as shown in FIG. 4(B), the insulating member 11 is assembled so that each wing section 11G is positioned on an outer side of the insulating member 11. When the insulating member 11 is inserted into the battery can 2, the wing section 11G is folded so that an edge section of the opening section 2D (FIG. 2) of the battery can 2 pushes the wing section 11G and causes the wing section 11G to approach a corresponding narrow-width side surface of the insulating member 11.

In doing so, by pushing back the side of the bottom surface 11A of the opposing narrow-width side surface 11C in a direction approaching the positive electrode-side coupling end section 13A of the positive electrode collector plate 13 or the negative electrode-side coupling end section 14A of the negative electrode collector plate 14 of the charge/discharge body 17 housed in the insulating member 11, the wing section 11G prevents a portion on the side of the bottom surface 11A of the opposing narrow-width side surface 11C from protruding outward and being caught by the opening section 2D of the battery can 2.

The insulating member 11 is manufactured by, for example, punching out a raw sheet made of synthetic resin such as polypropylene (PP) or polyethylene (PE) by a blade such as the Pinnacle (R) Die. In doing so, by punching out an external shape portion in the insulating member 11 by a full cut with the Pinnacle (R) Die and making cuts to a depth corresponding to a half cut by adjusting an edge of the Pinnacle (R) Die to an obtuse angle in folded portions (portions depicted by a dashed line or a dashed-two dotted line in FIG. 4) in the insulating member 11, creases (including the crease 11E) can be formed in the folded portions.

Since the purpose of the half cut is to form creases which enable the insulating member 11 to be readily folded into a rectangular parallelepiped shape with one face opened, the edge of the Pinnacle (R) Die may be either a continuous solid line shape or a discontinuous line shape such as a dashed line or a chain line.

In addition, in order to form a rectangular parallelepiped shape with one face opened by folding, the thickness of the raw sheet is desirably thicker than 100 μm. When the thickness of the raw sheet is thinner than 100 μm, while the raw sheet can be folded, strength is insufficient for maintaining the rectangular parallelepiped shape.

(1-2) Insertion Procedure of Wound Electrode Group into Battery can

Figure 5:
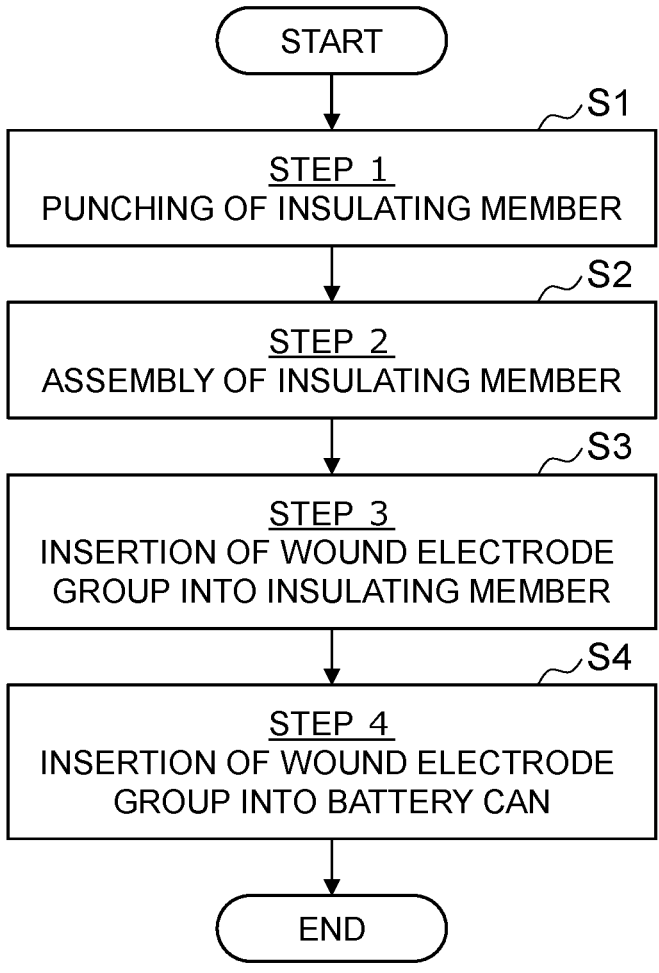
FIG. 5 is a step chart for explaining steps until the wound electrode group is coated by the insulating member and inserted into a battery can in the first embodiment.

FIG. 5 shows a procedure of an operation of inserting the wound electrode group 12 into the battery can 2 after coating the wound electrode group 12 with the insulating member 11. Here, a procedure will be described when, after assembling the insulating member 11 in a rectangular parallelepiped shape having the opening section 11D as shown in FIG. 2, the charge/discharge body 17 is coated by the insulating member 11 so as to insert the wound electrode group 12 from the opening section 11D of the insulating member 11, and the charge/discharge body 17 is subsequently inserted into the battery can 2.

First, as a first step, the insulating member 11 is punched out by a full cut using a blade such as the Pinnacle (R) Die from a raw sheet made of an insulation material such as polypropylene in the shape shown in FIG. 4(A). In doing so, by respectively performing a half cut using a blade such as the Pinnacle (R) Die with an edge which is an obtuse angle at the respective boundaries between the bottom surface 11A and the wide-width side surfaces 11B, the respective boundaries between the wide-width side surfaces 11B and the narrow-width side surfaces 11C, the respective boundaries between the narrow-width side surfaces 11C and the heat welding object sections 11F, the respective boundaries between the bottom surface 11A and the wing sections 11G, and center sections in the width direction of the respective narrow-width side surfaces 11C in the insulating member 11, creases (including the crease 11E) are simultaneously formed at these positions (S1).

Note that the shape of the insulating member 11 which is punched out at this point is not limited to the shape shown in FIG. 4(A) and various shapes can be widely applied as long as the shapes at least include a surface to become the bottom surface 11A, a pair of surfaces to become the wide-width side surfaces 11B, and a pair of surfaces to become the narrow-width side surface 11C when assembled.

Next, as a second step, the insulating member 11 punched out in the first step is folded along each crease to assemble a rectangular parallelepiped shape having the opening section 11D (FIG. 2 and FIG. 4(B)) (S2). In doing do, a jig is applied to each of the creases (including the crease 11E) of the insulating member 11 and the insulating member 11 is folded so as to fold the creases along the jigs. In addition, after folding the insulating member 11 in the shape shown in FIG. 4(B), each heat welding object section 11F described above is heat-welded to a location (in the example shown in FIG. 4(A), the wide-width side surface 11B) which overlaps with the heat welding object section 11F while maintaining the rectangular parallelepiped shape.

As the location to be heat-welded, locations in the charge/discharge body 17 where the positive electrode mixture layer 21A (FIG. 3) of the positive electrode 21 (FIG. 3) or the negative electrode mixture layer 23A (FIG. 3) of the negative electrode 23 (FIG. 3) come into contact or locations opposing the positive electrode mixture layer 21A and the negative electrode mixture layer 23A are desirably avoided as in the present embodiment, and the heat welding is desirably performed in regions not affected by stringing of resin caused by the heat welding or a variance in thickness due to unevenness of a welded portion such as locations in the charge/discharge body 17 which come into contact with or which oppose the positive electrode foil-exposed section 21B (FIG. 3) of the positive electrode 21 or the negative electrode foil-exposed section 23B (FIG. 3) of the negative electrode 23.

Next, as a third step, the charge/discharge body 17 is housed in the insulating member 11 assembled in the second step so as be inserted into the insulating member 11 (S3). In PLT 1 (Japanese Patent No. 6092108) described above, a narrow-width side surface of an insulating member with a bottomed box-like shape is not provided with a crease resembling the crease 11E according to the present application, and since clearances are not secured between the narrow-width side surface of the insulating member and the positive electrode-side coupling end section 13A of the positive electrode collector plate 13 or the negative electrode-side coupling end section 14A of the negative electrode collector plate 14 of the charge/discharge body 17, there is a problem in that, after inserting the charge/discharge body 17, a deformation due to interference upon insertion of the charge/discharge body 17 occurs in a side edge section on a side of the narrow-width side surface of an opening section in the insulating member and causes a decline in yield due to defective insulation.

By comparison, with the insulating member 11 according to the present embodiment, since the crease 11E is provided in a center section in the width direction of each narrow-width side surface 11C and each narrow-width side surface 11C is folded in a direction of separation from the charge/discharge body 17 along the crease 11E, clearances are secured between the narrow-width side surfaces 11C of the insulating member 11 and the positive electrode-side coupling end section 13A of the positive electrode collector plate 13 or the negative electrode-side coupling end section 14A of the negative electrode collector plate 14 of the charge/discharge body 17, insertability of the charge/discharge body 17 into the insulating member 11 is improved, a deformation due to interference upon insertion of the charge/discharge body 17 hardly occurs in a side edge section on a side of the narrow-width side surfaces 11C of the opening section 11D (FIGS. 2 and 4(B)) in the insulating member 11 when inserting the charge/discharge body 17 into the insulating member 11, and a frequency of occurrence of defective products in the third step can be suppressed.

Subsequently, as a fourth step, the charge/discharge body 17 inserted into the insulating member 11 is housed in the battery can 2 so as to be inserted into the battery can 2 as-is (S4). Accordingly, the charge/discharge body 17 can be housed in the battery can 2 in a state where the charge/discharge body 17 is coated with the insulating member 11.

(1-3) Advantageous Effect of Present Embodiment

With the square secondary battery 1 according to the present embodiment configured as described above, since both narrow-width side surfaces 11C of the insulating member 11 are respectively folded in a direction of separation from the charge/discharge body 17, clearances can be secured between the positive electrode-side coupling end section 13A and the negative electrode-side coupling end section 14A and the respective narrow-width side surfaces 11C of the insulating member 11.

Accordingly, with the present square secondary battery 1, since the positive electrode-side coupling end section 13A of the positive electrode collector plate 13 or the negative electrode-side coupling end section 14A of the negative electrode collector plate 14 is prevented from interfering with an edge section on the side of the narrow-width side surface 11C in the opening section 11D of the insulating member 11 when inserting the charge/discharge body 17 into the insulating member 11, insertability of the charge/discharge body 17 into the insulating member 11 can be improved. Therefore, according to the present square secondary battery 1, a decline in yield attributable to insertion failure when inserting the charge/discharge body 17 into the insulating member 11 can be suppressed.

In addition, with the present square secondary battery 1, since clearances can be secured between the positive electrode-side coupling end section 13A of the positive electrode collector plate 13 or the negative electrode-side coupling end section 14A of the negative electrode collector plate 14 and each narrow-width side surface 11C of the insulating member 11 as described above, a tensile stress to each narrow-width side surface 11C which is generated in the insulating member 11 in association with swelling of the wound electrode group 12 during changing and discharging can be alleviated. Therefore, according to the present square secondary battery 1, long-term reliability of the insulating member 11 can be improved.

Therefore, according to the present embodiment, the square secondary battery 1 capable of suppressing a decline in yield while also improving long-term reliability of an insulating member can be realized.

(2) Second Embodiment

Figure 6:
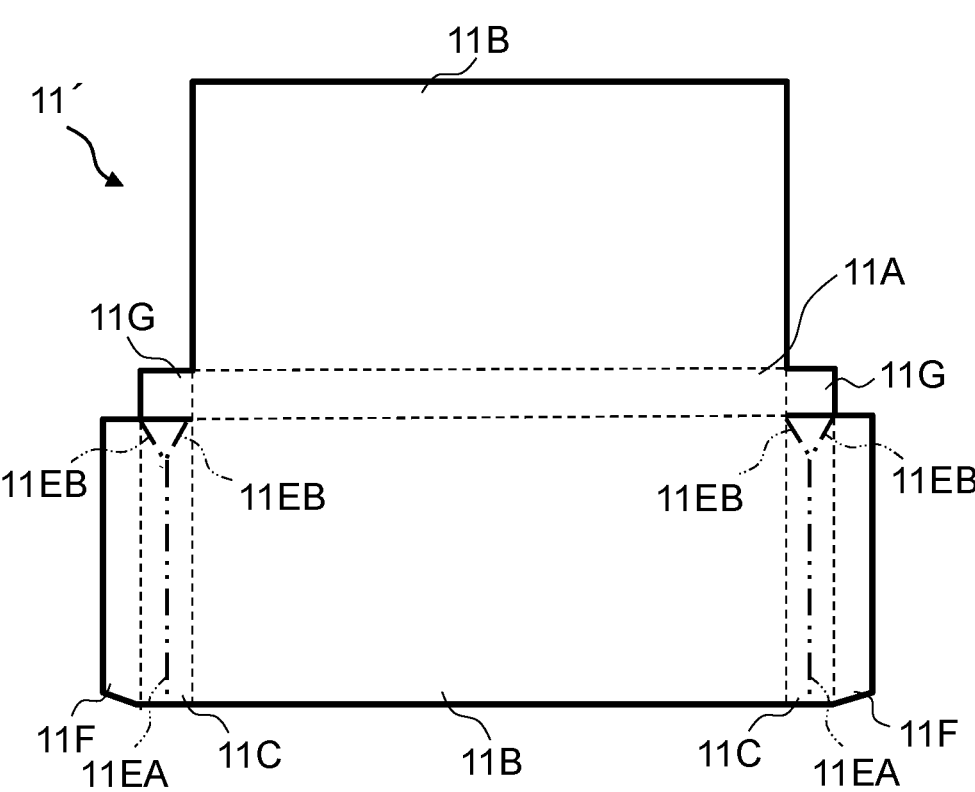
FIG. 6 is a development view showing a configuration of an insulating member according to the second embodiment.

FIG. 6 shown by attaching same reference signs to portions corresponding to FIG. 4 represents a development view of an insulating member 11' according to a second embodiment which is applied to the square secondary battery 1 shown in FIG. 1 in place of the insulating member 11 according to the first embodiment. The insulating member 11' differs from the insulating member 11 according to the first embodiment in that a crease 11EA formed in a center section in the width direction of the narrow-width side surface 11C does not reach the bottom surface 11A from the opening section 11D (refers to FIG. 2 and FIG. 4(B)) and creases 11EB are respectively provided from an end section on a side close to the bottom surface 11A in the crease 11EA toward both end sections of a side adjacent to the bottom surface 11A in the narrow-width side surface 11C.

In this case, the creases 11EA and 11EB are respectively formed so that, with respect to the narrow-width side surface 11C of the insulating member 11' opposing the positive electrode-side coupling end section 13A (FIG. 2) of the positive electrode collector plate 13 (FIG. 2) of the wound electrode group 12 to be inserted, the creases 11EA and 11EB are folded in a direction in which the narrow-width side surface 11C separates from the charge/discharge body 17 (more accurately, a direction in which the wound electrode group 12 separates from the positive electrode-side coupling end section 13A), and with respect to the narrow-width side surface 11C of the insulating member 11' opposing the negative electrode-side coupling end section 14A (FIG. 2) of the negative electrode collector plate 14 (FIG. 2) of the charge/discharge body 17, the creases 11EA and 11EB are folded in a direction in which the narrow-width side surface 11C separates from the charge/discharge body 17 (more accurately, a direction in which the wound electrode group 12 separates from the negative electrode-side coupling end section 14A).

Accordingly, with the insulating member 11' according to the present embodiment, in an assembled state as shown in FIG. 4(B), an inclined surface with a triangular shape which is inclined toward a boundary with the bottom surface 11A is formed at an end section on the side of the bottom surface 11A in each narrow-width side surface 11C.

With the insulating member 11' according to the present embodiment configured as described above, since an inclined surface is formed in each edge section adjacent to the bottom surface 11A in each narrow-width side surface 11C, bulging of an end section on the side of the bottom surface 11A of each narrow-width side surface 11C is suppressed by the inclined surface.

As a result, when inserting the insulating member 11' into the battery can 2, clearances similar to those in a case where creases are not provided can be secured between the opening section 2D (FIG. 2) of the battery can 2 and an end section on the side of the bottom surface 11A in each narrow-width side surface 11C of the insulating member 11' and, accordingly, insertability of the insulating member 11' to the battery can 2 can be secured.

Therefore, with the insulating member 11' according to the present embodiment, an advantageous effect of improving insertability to the battery can 2 can be obtained in addition to the advantageous effect obtained by the first embodiment.

(3) Third Embodiment

Figure 7:
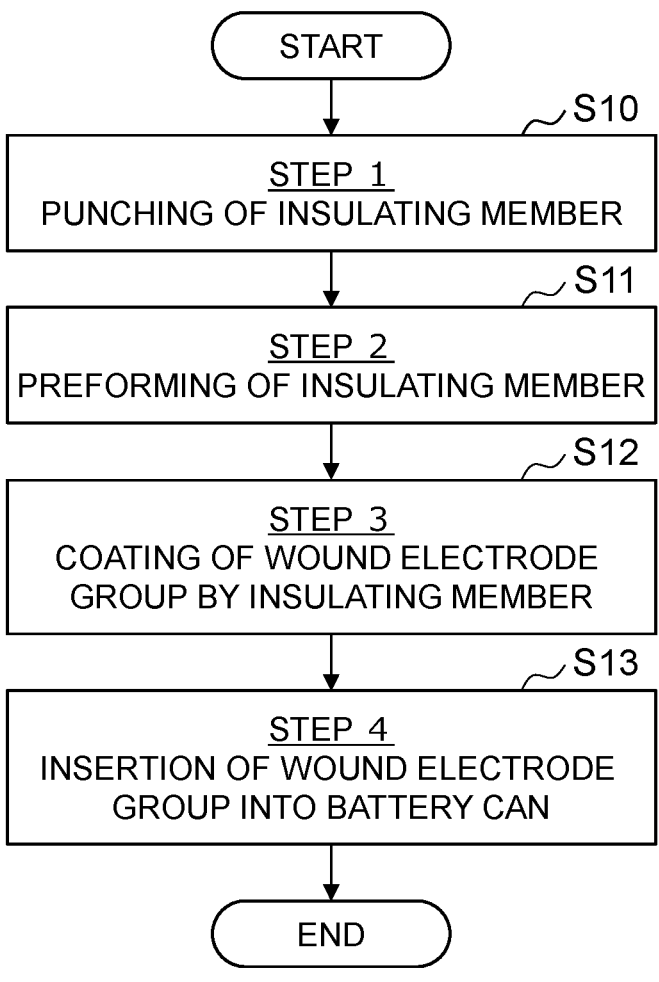
FIG. 7 is a step chart for explaining steps until a wound electrode group is coated by an insulating member and inserted into a battery can in the third embodiment.

FIG. 7 shows an operation procedure according to a third embodiment of an operation of inserting the charge/discharge body 17 into the battery can 2 after coating the charge/discharge body 17 with the insulating member 11. In the present embodiment, without assembling the insulating member 11 into a rectangular parallelepiped shape having the opening section 11D as shown in FIG. 2 before coating the charge/discharge body 17 with the insulating member 11, the charge/discharge body 17 and the insulating member 11 are inserted into the battery can 2 after assembling the charge/discharge body 17 by coating the charge/discharge body 17 with the insulating member 11 so as to wind the insulating member 11 around the charge/discharge body 17.

First, as a first step, the insulating member 11 with the shape shown in FIG. 4(A) is punched out by a full cut using a blade such as the Pinnacle (R) Die from a raw sheet made of an insulation material such as polypropylene. In doing so, in a similar manner as the first step described with respect to step S1 shown in FIG. 5, the crease 11E is formed in the center section in the width direction of each narrow-width side surface 11C of the insulating member 11 (S10).

Next, as a second step, the insulating member 11 punched out in the first step is folded along each of the creases (including the crease 11E) to be folded into a rectangular parallelepiped shape (S11). Note that, in the present embodiment, the second step only involves preforming each crease of the insulating member 11 and heat welding of the heat welding object section 11F (FIG. 4(A)) is not performed.

Next, as a third step, the charge/discharge body 17 is placed on the insulating member 11 having been preformed in the second step to assume a same positional relationship as a positional relationship after coating with the insulating member 11 and, subsequently, the charge/discharge body 17 is coated by the insulating member 11 so as to fold each crease of the insulating member 11 exactly as preformed in the second step (S12).

Subsequently, as a fourth step, the charge/discharge body 17 coated by the insulating member 11 is inserted into the battery can 2 (S13). The insertion of the charge/discharge body 17 into the battery can 2 is performed while maintaining, using a facility mechanism or the like, a state where the charge/discharge body 17 is coated with the insulating member 11. In doing so, the insulating member 11 may be held in a rectangular parallelepiped shape by the facility mechanism during insertion to the battery can 2 or by a worker responsible for an insertion step to the battery can 2 and, for example, the heat welding object section 11F described above in the insulating member 11 need not be heat-welded to the wide-width side surface 11B or the like as in the first embodiment.

As described above, in the present embodiment, since the charge/discharge body 17 is inserted into the battery can 2 in a state where the charge/discharge body 17 is simply coated with the insulating member 11 as if being wrapped with the insulating member 11 without assembling the insulating member 11 by heat-welding the heat welding object section 11F (FIG. 4(A)) of the insulating member 11 to the wide-width side surface 11B, a production facility of the present square secondary battery 1 can be simplified and manufacturing operations of the present square secondary battery 1 can be facilitated.

Therefore, with the manufacturing method of the square secondary battery 1 according to the present embodiment, an advantageous effect of simplifying production of the square secondary battery 1 can be obtained in addition to the advantageous effect obtained by the first embodiment.

(4) Other Embodiments

While a case where the present invention is applied to the square secondary battery 1 configured as shown in FIGS. 1 and 2 has been described in the first to third embodiments presented above, the present invention is not limited thereto and is widely applicable to other square secondary batteries with various configurations.

In addition, while a case where the crease 11E is provided at a center position in the width direction of the narrow-width side surface 11C of the insulating members 11 and 11' has been described in the first to third embodiments presented above, the present invention is not limited thereto and the crease 11E may be formed in a height direction of the narrow-width side surface 11C at locations other than the center position in the width direction of the narrow-width side surface 11C. In this case, the number of creases 11E is not limited to one and may be two or more.

Furthermore, while a case where the crease 11E is formed on both narrow-width side surfaces 11C of the insulating members 11 and 11' has been described in the first to third embodiments presented above, the present invention is not limited thereto and the crease 11E may be formed on only one of the narrow-width side surfaces 11C. Even in this case, clearances, albeit slight, can be secured between the narrow-width side surface 11C of the insulating member 11 and the positive electrode-side coupling end section 13A of the positive electrode collector plate 13 and the negative electrode-side coupling end section 14A of the negative electrode collector plate 14.

In addition, while a case where the crease 11E of the insulating member 11 is formed from the opening section 11D so as to reach the bottom surface 11A in a height direction of the narrow-width side surface 11C in the first to third embodiments presented above, the present invention is not limited thereto and creases similar to the crease 11E may be formed from the opening section 11D to midway between the opening section 11D and the bottom surface 11A, from the bottom surface 11A to midway between the bottom surface 11A and the opening section 11D, or between the opening section 11D and the bottom surface 11A without including the opening section 11D and the bottom surface 11A. Even in this case, advantageous effects similar to the first and third embodiments can be obtained.

INDUSTRIAL APPLICABILITY

The present invention can be widely applied to square secondary batteries of various configurations.

REFERENCE SIGNS LIST

1 . . . square secondary battery, 2 . . . battery can, 2A, 11A . . . bottom surface, 2B, 11B . . . wide-width side surface, 2C, 11C . . . narrow-width side surface, 2D, 11D . . . opening section, 3 . . . battery lid, 11, 11' . . . insulating member, 11E, 11EA, 11EB . . . crease, 12 . . . wound electrode group, 13 . . . positive electrode collector plate, 14 . . . negative electrode collector plate, 11F . . . heat welding object section, 11G . . . wing section, 17 . . . charge/discharge body, 21 . . . positive electrode, 21B . . . positive electrode foil-exposed section, 23 . . . negative electrode, 23B . . . negative electrode foil-exposed section

The invention claimed is:

1. A square secondary battery, comprising:

a conductive container which is formed in a rectangular parallelepiped shape opened on one surface side;

a lid which seals the one surface side of the container;

a charge/discharge body which is housed in the container and which has electrodes respectively formed on both sides in a width direction; and an insulating member which coats the charge/discharge body and which insulates the charge/discharge body and the container from each other, wherein the insulating member is formed in a rectangular parallelepiped shape opened on one surface side and at least one side surface among a pair of narrow-width side surfaces respectively opposing the electrodes of the charge/discharge body is folded in a direction of separation from the charge/discharge body along a height direction, wherein the insulating member is formed by folding an insulation sheet formed of an insulation member, and on at least one side surface among the narrow-width side surfaces respectively opposing the electrodes of the charge/discharge body in the insulation sheet, a crease for folding the narrow-width side surface in a direction of separation from the charge/discharge body is formed in a direction from the one open surface toward the bottom surface.

2. The square secondary battery according to claim 1, wherein in the insulating member, an inclined surface which is inclined toward a boundary with the bottom surface is formed at an end section on the side of the bottom surface in the side surface which is folded in a direction of separation from the charge/discharge body among the pair of side surfaces respectively opposing the electrodes of the charge/discharge body.

3. A manufacturing method of a square secondary battery, the square secondary battery including:

a conductive container which is formed in a rectangular parallelepiped shape opened on one surface side;

a lid which seals the one surface side of the container;

a charge/discharge body which is housed in the container and which has electrodes respectively formed on both sides in a width direction; and an insulating member which coats the charge/discharge body and which insulates the charge/discharge body and the container from each other, the insulating member being formed in a rectangular parallelepiped shape opened on one surface side by folding an insulation sheet formed of an insulation material, and at least one side surface among a pair of narrow-width side surfaces respectively opposing the electrodes of the charge/discharge body being folded in a direction of separation from the charge/discharge body along a height direction, and formed by folding an insulation sheet formed of an insulation member, and on at least one side surface among the narrow-width side surfaces respectively opposing the electrodes of the charge/discharge body in the insulation sheet, a crease for folding the narrow-width side surface in a direction of separation from the charge/discharge body is formed in a direction from the one open surface toward the bottom surface, and the manufacturing method of a square secondary battery comprising:

a first step of creating the insulation sheet;

a second step of forming the insulating member by folding the insulation sheet; and a third step of housing the charge/discharge body so as to insert the charge/discharge body into the insulating member from the open one surface side of the insulating member.

4. The manufacturing method of a square secondary battery according to claim 3, further comprising:

a fourth step of housing the charge/discharge body being housed in the insulating member in the container so as to insert the charge/discharge body from the open one surface side of the container.

5. The manufacturing method of a square secondary battery according to claim 3, wherein in the second step, an inclined surface which is inclined toward a boundary with the bottom surface is formed at an end section on the side of the bottom surface of the side surface which is folded in a direction of separation from the charge/discharge body among the pair of side surfaces respectively opposing the electrodes of the charge/discharge body in the insulating member.

6. A manufacturing method of a square secondary battery, the square secondary battery including:

a conductive container which is formed in a rectangular parallelepiped shape opened on one surface side;

a lid which seals the one surface side of the container;

a charge/discharge body which is housed in the container and which has electrodes respectively formed on both sides in a width direction; and an insulating member which coats the charge/discharge body and which insulates the charge/discharge body and the container from each other, the insulating member being formed in a rectangular parallelepiped shape opened on one surface side by folding an insulation sheet formed of an insulation material, and at least one side surface among a pair of narrow-width side surfaces respectively opposing the electrodes of the charge/discharge body being folded in a direction of separation from the charge/discharge body along a height direction, and formed by folding an insulation sheet formed of an insulation member, and on at least one narrow-width side surface among the side surfaces respectively opposing the electrodes of the charge/discharge body in the insulation sheet, a crease for folding the narrow-width side surface in a direction of separation from the charge/discharge body is formed in a direction from the one open surface toward the bottom surface, and the manufacturing method of a square secondary battery comprising:

a first step of creating the insulation sheet; and a second step of forming the insulating member by folding the insulation sheet so as to coat the charge/discharge body.

7. The manufacturing method of a square secondary battery according to claim 6, further comprising:

a third step of housing the charge/discharge body being coated by the insulating member made of the insulation sheet in the container so as to insert the charge/discharge body from the open one surface side of the container.

8. The manufacturing method of a square secondary battery according to claim 6, wherein in the second step, an inclined surface which is inclined toward a boundary with the bottom surface is formed at an end section on the side of the bottom surface of the side surface which is folded in a direction of separation from the charge/discharge body among the pair of side surfaces respectively opposing the electrodes of the charge/discharge body in the insulating member.

9. The square secondary battery according to claim 1, wherein in the insulating member, an inclined surface which is inclined toward a boundary with the bottom surface is formed at an end section on the side of the bottom surface in the side surface which is folded in a direction of separation from the charge/discharge body among the pair of side surfaces respectively opposing the electrodes of the charge/discharge body.

10. The manufacturing method of a square secondary battery according to claim 4, wherein in the first step, on at least one side surface among the side surfaces respectively opposing the electrodes of the charge/discharge body in the insulation sheet, a crease for folding the side surface in a direction of separation from the charge/discharge body is formed in a direction from the one open surface toward the bottom surface.

11. The manufacturing method of a square secondary battery according to claim 7, wherein in the first step, on at least one side surface among the side surfaces respectively opposing the electrodes of the charge/discharge body in the insulation sheet, a crease for folding the side surface in a direction of separation from the charge/discharge body is formed in a direction from the one open surface toward the bottom surface.

* * * * *